United States Patent [19]

Yotsuya et al.

[11] Patent Number: 4,668,576
[45] Date of Patent: May 26, 1987

[54] TAPE PRIMER COMPOSITION

[75] Inventors: Isao Yotsuya; Kenji Suzuki; Kazumasa Asano, all of Osaka, Japan

[73] Assignee: Nitto Electric Industrial Co., Ltd., Osaka, Japan

[21] Appl. No.: 753,074

[22] Filed: Jul. 9, 1985

[30] Foreign Application Priority Data

Jul. 9, 1984 [JP] Japan .................... 59-141882

[51] Int. Cl.⁴ ................................. C09J 7/02
[52] U.S. Cl. .................... 428/353; 156/187; 427/208.4; 427/208.8; 428/354; 428/355; 428/356; 428/423.1; 428/424.2; 428/424.8; 428/423.9
[58] Field of Search ............ 428/356, 353, 354, 355, 428/906, 423.1, 424.2, 424.8, 423.9; 427/208.4, 208.8; 156/187

[56] References Cited

U.S. PATENT DOCUMENTS

| | | | |
|---|---|---|---|
| 2,912,348 | 11/1959 | Lavanchy | 428/353 |
| 2,964,422 | 12/1960 | Bergstedt et al. | 428/353 |
| 3,085,903 | 4/1963 | Bemmels et al. | 428/353 |
| 3,197,326 | 7/1965 | Webber | 428/356 |
| 3,340,088 | 9/1967 | Pennisi et al. | 428/353 |
| 4,472,231 | 9/1984 | Jenkins | 428/420 |

FOREIGN PATENT DOCUMENTS

| | | | |
|---|---|---|---|
| 55252 | 5/1981 | Japan | 428/353 |
| 6055251 | 5/1981 | Japan | 428/353 |
| 211175 | 1/1986 | Japan | 428/353 |

Primary Examiner—Edith Buffalow
Attorney, Agent, or Firm—Sughrue, Mion, Zinn, Macpeak & Seas

[57] ABSTRACT

A tape primer composition that forms a primer coat between a polyethylene film or sheet support and an overlying butyl rubber base adhesive layer is described, said primer composition consisting essentially of a butyl rubber, a polyisocyanate compound, and an organic solvent.

11 Claims, 4 Drawing Figures

TAPE PRIMER COMPOSITION

FIELD OF THE INVENTION

The present invention relates to a tape having a butyl rubber base adhesive layer formed on a polyethylene film or sheet support. More particularly, the invention relates to a primer composition provided between said support and adhesive layer in order to ensure better adhesion therebetween.

BACKGROUND OF THE INVENTION

One of the methods used today to protect petroleum or gas pipelines from corrosion is to wrap corrosion-resistant tape around base steel pipes in the field. The support of the corrosion-resistant tape is usually made of a polyethylene film or sheet that is economical and exhibits good low temperature performance and high chemical stability. The adhesive layer on the tape is usually made of butyl rubbers having low water permeabilties.

The conventional corrosion-resistant tape is usually available in a roll form, without release paper attached to the tape, because of economy and the ease with which the corrosion-resistant tape can be wrapped around steel pipes. However, in wrapping operations in cold climates (e.g., about $-30°$ C.), the adhesive layer may detach from the support while the corrosion-resistant tape being unrolled.

The polyethylene film or sheet is usually surface-treated by the chromate comnversion process or corona discharge in order to provide better adhesion to the adhesive layer. However, even this method does not ensure complete prevention of the detachment of the adhesive layer from the support at cryogenic temperatures (i.e., about $-30°$ C.), particularly when the corrosion-resistant tape is unrolling at fast speed for mechanical wrapping around the steel pipe. In order to avoid this problem, the corrosion-resistant tape must be kept in a warming chamber and taken out just before use in cold climates, but this greatly reduces the efficiency of wrapping operations.

SUMMARY OF THE INVENTION

The principal object, therefore, of the present invention is to provide a primer that improves the adhesion between the support and adhesive layer of tape to such an extent that the adhesive layer will not detach from the support while the tape is unrolled at temperatures of $-30°$ C. and thereabouts.

This object of the present invention can be achieved by a tape primer composition that is provided between a polyethylene film or sheet support and an overlying butyl rubber base adhesive layer and which consists essentially of a butyl rubber, a polyisocyanate compound, and an organic solvent.

DETAILED DESCRIPTION OF THE INVENTION

Figure 1:
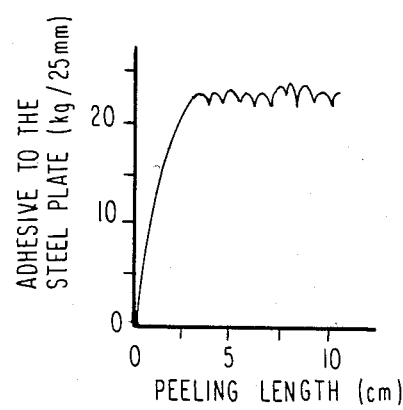
FIGS. 1 to 4 depict four profiles of breakage on adhesion of the corrosion-resistant tape samples prepared in Examples 9 to 20 described hereinafter to the steel plate.

The butyl rubber used as one of the essential ingredients of the primer composition in accordance with the present invention may be selected from among ordinary butyl rubbers (virgin butyl rubbers), reclaimed butyl rubbers, and modified butyl rubbers such as chlorinated or brominated butyl rubbers. The primer composition containing reclaimed or modified butyl rubbers as the essential rubber component is more effective in preventing the detachment of adhesive layer at low temperatures than the primer composition containing virgin butyl rubber. Additionally, reclaimed or modified butyl rubbers need relatively smaller amounts of the polyisocyanate compound for achieving the purpose of preventing detachment of the adhesive layer at low temperatures. Therefore, the primer composition in accordance with a particularly preferred embodiment contains a butyl rubber at least 50% of which is accounted for by a reclaimed or modified butyl rubber.

The reclaimed butyl rubber that may be used in the present invention is reclaimed from vulcanized butyl rubber by the following steps: grinding and milling the vulcanized rubber with crusher rolls, desulfurizing the rubber particles under conditions under which temperature is about 150° to 200° C., pressure is about 8 to 16 kg/cm$^2$ and time is about 3 to 10 hours, smoothing the desulfurized rubber by 8 to 12 passes through rolling mills, and removing metal and other contaminants from the rubber sheet. Reclaimed butyl rubber preferred for use in the present invention have a specific gravity of from 1.14 to 1.18, a rubber content of from 50 to 59 wt% as rubber hydrocarbons, acetone solubles of from 4 to 16 wt%, a Mooney viscosity ML$_{1+4(100° C.)}$ of from 25 to 70, a carbon black content of from 30 to 32 wt%, elongation after vulcanization (JIS K-6313)$\geq$450%, and tensile strength after vulcanization (JIS K-6313)$\geq$65 kg/cm$^2$.

The chlorinated (or brominated) butyl rubber is preferably an addition product of butyl rubber and from 1.0 to 1.4 wt% of chlorine (or from 1.8 to 2.4 wt% of bromine). The chlorinated butyl rubber preferably has a Mooney viscosity ML$_{1+8(125° C.)}$ of from 45 to 55 and ML$_{1+8(100° C.)}$ of from 51 to 60 whereas the brominated butyl rubber has a preferred Mooney viscosity ML$_{1+8(125° C.)}$ of from 27 to 34 and 41 to 51.

The polyisocyanate compound present as the second essential ingredient of the primer composition of the present invention is selected from among the compounds containing generally 2 or 3 isocyanato groups in the molecule, and specific examples of such polyisocyanate compounds are triphenylmethane triisocyanate, tris(p-isocyanatophenyl)thiophosphate and hexamethylene 1,6-diisocyanate.

For the purpose of preventing the detachment of the adhesive layer at low temperatures, the proportion of the polyisocyanate compound should be appropriately selected to achieve the intended purpose. As already mentioned, if the reclaimed or modified butyl rubber is used as the butyl rubber component, a relatively small amount of the polyisocyanate compound will serve the purpose of preventing the detachment of adhesive layer at low temperature. If the butyl rubber component contains 50 wt% or more of reclaimed or modified butyl rubber, the polyisocyanate compound is generally used in an amount of at least 0.8 part, preferably in the range of from 1 to 200 parts, per 100 parts by weight of the butyl rubber component. For practical purposes, the range of from 3 to 150 parts by weight will suffice. If the butyl rubber component exclusively made of virgin butyl rubbers, the proportion of the polyisocyanate compound should be at least 30 parts, preferably in the range of 50 to 200 parts, for 100 parts by weight of the butyl rubber component.

The organic solvent used as the third component of the primer composition of the present invention may be selected from among any solvents that are capable of uniformly dispersing or dissolving the butyl rubber and polyisocyanate compound. Illustrative organic solvents that satisfy this requirement are toluene, xylene, methyl chloride and butyl acetate. Such organic solvents are generally used in amounts ranging from 9 to 100 parts per part by weight of the sum of the butyl rubber and polyisocyanate compound.

While the tape primer composition in accordance with the present invention consists essentially of the above described butyl rubber, polyisocyanate compound and organic solvent, said composition may optionally contain tack-providing resins such as a polyterpene base resin and a petroleum base resin, antioxidants such as a phenol base antioxidant, pigments such as carbon black and silica, or fillers such as calcium carbonate, clay and talc.

The primer composition in accordance with the present invention is typically used with a corrosion-resistant tape consisting of a polyethylene film or sheet and a butyl rubber base adhesive layer so as to form a primer coat between the support and the adhesive layer. The primer composition in accordance with the present invention is also used with a water-resistant sheet consisting of a polyethylene film or sheet and butyl rubber base adhesive layer so as to form a primer coat between the support and the adhesive layer.

In order to form the primer coat on the polyethylene film or sheet, a layer of the primer composition is applied and heated generally at temperatures between 60° and 120° C. for periods ranging from 0.3 to 10 minutes. As a result of this heating, the organic solvent is removed from the primer composition while the latter is crosslinked to form the primer coat. The thickness of the primer coat is preferably in the range of from about 0.01 to 10 μm. The polyethylene film or sheet is usually surface-treated by, for example, corona discharge or chromate conversion process, prior to the application of the primer composition.

A butyl rubber base adhesive is then applied to the primer coat so as to form a butyl rubber base adhesive layer. The resulting tape is rolled on itself for storage and shipment. The butyl rubber base adhesive consists of a base polymer that contains a butyl rubber as the principal component, and necessary additives such as a tack-providing resin (e.g., a polyterpene base resin and a petroleum base resin), a filler (e.g., calcium carbonate, clay and talc), a softener (e.g., process oil) and a crosslinking agent. The butyl rubber base adhesive layer formed of this adhesive has a thickness which generally ranges from 30 to 1,000 μm.

The tape thus prepared is characterized by improved adhesion between the polyethylene film or sheet support and the butyl rubber base adhesive layer because they are securely joined by the primer coat formed of the primer composition of the present invention. Because of this improved adhesion, the adhesive layer will not detach from the support even if the tape is wrapped around the steel pipe by automatically unrolling the tape at fast speeds of from 1 to 30 m/min at low temperatures in the neighbourhood of −30° C.

The mechanism behind the improved adhesion between the polyethylene film or sheet support and the primer composition is as follows. When the primer composition is applied to the support, it penetrates into fine voids in the surface of the support. Upon subsequent heating, the organic solvent in the primer composition evaporates and at the same time, the polyisocyanate compound crosslinks both with polar groups that have been introduced into the surface of the support as a result of surface treatment and with polar groups that are present in the butyl rubber component of the primer composition, thereby providing a primer coat that securely joins to the support.

Reclaimed or modified butyl rubbers have more polar groups than virgin butyl rubbers and such polar groups are reactive with the polyisocyanate compound, and therefore, a stronger adhesion to the support can be attained by using a primer composition containing reclaimed or modified butyl rubbers in the butyl rubber component. The primer coat formed from the rubber composition of the present invention contains butyl rubbers, and hence is highly compatible with the overlying butyl rubber base adhesive layer, such that the two join together well.

As described in the foregoing, the primer composition in accordance with the present invention contains both the butyl rubber and polyisocyanate compound as two essential non-volatile components. Because of the use of these two components, the composition will function effectively as a primer for tape consisting of a polyethylene film or sheet support and an overlying butyl rubber base adhesive layer. A roll of the tape incorporating the primer coat formed of this composition can be rapidly unrolled for wrapping purposes not only at ordinary temperatures but also at lower temperatures (e.g., at about −30° C.) without causing detachment of the adhesive layer from the support.

This effect of the primer composition of the present invention can be further enhanced by using a butyl rubber component containing at least 50 wt% of a reclaimed or modified butyl rubber.

The following Examples are provided for further illustration of the claimed primer composition and should not be construed as limiting. In the Examples and Comparative Examples, all "parts" are by weight.

EXAMPLES 1 TO 8

Primer compositions for corrosion-resistant tape were prepared by blending a reclaimed butyl rubber (having a specific gravity of 1.16, a rubber content of 56 wt%, acetone solubles of 8 wt%, a Mooney viscosity $ML_{1+4(100° C.)}$ of 35, a carbon black content of 31 wt%, an elongation after vulcanization (JIS K-6313) of 500%, and a tensile strength after vulcanization (JIS K-6313) of 75 kg/cm$^2$), a virgin butyl rubber, a polyisocyanate compound [tris[p-isocyanatephenyl]thiophosphate] and toluene in the proportions indicated in Table 1 below.

A molten 80/20 (wt. ratio) mixture of high-density polyethylene (Hizex 5000H, trademark for product of Mitsui Petrochemical Industries, Ltd., having a density of 0.960 and melt index of 0.12) and low-density polyethylene (Mirason 102, trademark for product of Mitsui Polychemical Co., Ltd., having a density of 0.920 and a melt index of 0.35) was extruded through a T-die to form a polyethylene film with a thickness of 0.15 mm. One surface of this film was subjected to corona discharge treatment.

A kneader was charged first with 100 parts of butyl rubber, then with 5 parts of carbon black, 10 parts of polyisobutylene rubber, 20 parts of a polyterpene base resin, 40 parts of polybutene and 120 parts of calcium carbonate. The respective ingredients were kneaded for 20 minutes to prepare a butyl rubber base adhesive.

To the corona discharge treated surface of the polyethylene film, each of the primer compositions was applied and heated at 80° C. for 5 minutes to form a primer coat with a thickness of 0.5 μm. The separately prepared butyl rubber base adhesive was applied to the primer coat either by calender rolls or through an extruder to form an adhesive layer with a thickness of 0.4 mm. The resulting corrosion-resistant tape was round about a cardboard core and cut to a width of 100 mm.

Each of the corrosion-resistant tape roll samples thus prepared was subjected to a wrapping test wherein the tape was mechanically wrapped around a steel pipe (tape unrolling speed: 10 m/min) at −30° C. to see whether any part of the adhesive layer detached from the polyethylene sheet. The rating indices used were as follows: A, no detachment of the adhesive layer occurred; B, only occasional detachment; C, frequent detachment; X, extensive detachment. The result of the wrapping test are also shown in Table 1.

The adhesion of the adhesive layer to polyethylene film in each of the tape samples was estimated by the following procedure: two specimens (25 mm wide) of the same tape sample were bonded together at the surface of the adhesive layer, a rubber roller having a weight of 5 kg once went and returned on the resulting bonded specimen and the thus obtained specimen was left for 30 minutes, and then the stress developed by peeling off one specimen at an angle of 180° was measured. The measurement was conducted both at 20° C. and at 0° C. The results of the measurements are shown in Table 1.

COMPARATIVE EXAMPLES 1 TO 3

Primer compositions were prepared by blending toluene and the reclaimed or virgin butyl rubber (which was the same as used in Examples 1 to 8) in the proportions indicated in Table 1. Corrosion-resistant tape samples were prepared using the primer compositions in the same manner as in Examples 1 to 8 and subjected to a wrapping test, as well as the measurement of adhesion in the same manner as in Examples 1 to 8. The results are shown in Table 1. The corrosion resistant tape prepared in Comparative Example 1 consisted of only the polyethylene sheet and butyl rubber adhesive layer and did not use a primer composition.

EXAMPLES 9 TO 14

Primer compositions for corrosion-resistant tape in accordance with the present invention were prepared by blending a brominated butyl rubber (bromine content of 2.1 wt%, Mooney viscosity $ML_{1+8(125° C.)}$ of 31), a polyisocyanate compound [tris(p-isocyanatophenyl)-thiophosphate] and toluene in the amounts indicated in Table 2 below.

A molten mixture 20/80 (wt. ratio) of the high-density and low-density polyethylenes used in Examples 1 to 8 was extruded through a T-die to form a polyethylene film with a thickness of 0.38 mm. One surface of the film was treated by corona discharge.

A kneader was charged first with 100 parts of butyl rubber, then with 5 parts of carbon black, 20 parts of polyisobutyrene, 20 parts of polybutene, 5 parts of a polyterpene base resin, 60 parts of soft calcium carbonate, 20 parts of process oil used as a softener and 2 parts of an antioxidant. The respective ingredients were kneaded for 20 minutes to prepare a butyl rubber base adhesive.

To the corona discharge treated surface of the polyethylene film, each of the primer compositions was applied to provide a dry thickness of 0.5 μm, and heated at 80° C. for 5 minutes to form a primer coat.

The separately prepared butyl rubber base adhesive was applied to the primer coat by calender rolls to form an adhesive layer having a thickness of 0.25 mm. The resulting corrosion-resistant tape was rolled, on a cardboard core and cut to a width of 25 mm.

The adhesion of each of the corrosion-resistant tape samples to a steel plate was measured at low temperature by the following method.

A steel plate (150×150×3 mm) was polished on one surface with sand paper (#280). The polished surface was coated with a hexane solution containing 20 wt% solids of the butyl rubber adhesive described above. Each of the tape samples was applied to the treated surface of the steel plate and left at ordinary room temperature (i.e., about 20° to 30° C.) for 4 weeks under a load of 10 g/cm². Samples were then left at 0° C., −30° C., and −50° C. for 4 hours, and thereafter, the addition of each of the corrosion-resistant tape samples to the steel plate was determined and the state of adhesion breakage was evaluated. The results are shown in Table 2. The symbols, A, B, C and D used in Table 2 to denote

TABLE 1

| | Examples | | | | | | | | Comparative Examples | | |
|---|---|---|---|---|---|---|---|---|---|---|---|
| | 1 | 2 | 3 | 4 | 5 | 6 | 7 | 8 | 1 | 2 | 3 |
| Proportions (parts) | | | | | | | | | | | |
| Reclaimed butyl rubber | 100 | 100 | 100 | 100 | 75 | 50 | 0 | 0 | — | 0 | 100 |
| Virgin butyl rubber | 0 | 0 | 0 | 0 | 25 | 50 | 100 | 100 | — | 100 | 0 |
| Polyisocyanate compound | 5 | 10 | 50 | 100 | 5 | 5 | 50 | 100 | — | 0 | 0 |
| Toluene | 5145 | 5390 | 7350 | 9800 | 5145 | 5145 | 7350 | 9800 | — | 4900 | 4900 |
| Adhesion (kg/25 mm) | | | | | | | | | | | |
| 20° C. | 7.9 (A) | 8.2 (A) | 10.4 (A) | 10.6 (A) | 5.6 (B) | 5.5 (B) | 6.0 (B) | 9.5 (B) | 2.0 (B) | 4.9 (B) | 4.3 (B) |
| 0° C. | 8.8 (A) | 10.3 (A) | 12.1 (A) | 12.3 (A) | 5.9 (B) | 6.8 (B) | 6.0 (B) | 6.5 (B) | 4.0 (B) | 5.0 (B) | 5.9 (B) |
| Wrapping test | A | A | A | A | B | B | B | A | X | X | X |

Figure 2:
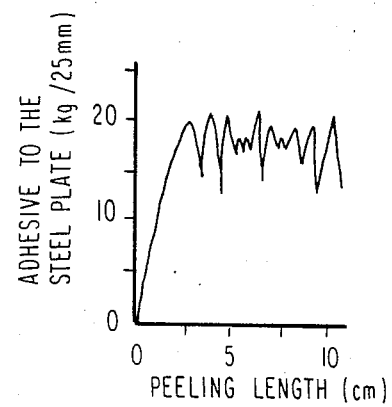
Figure 3:
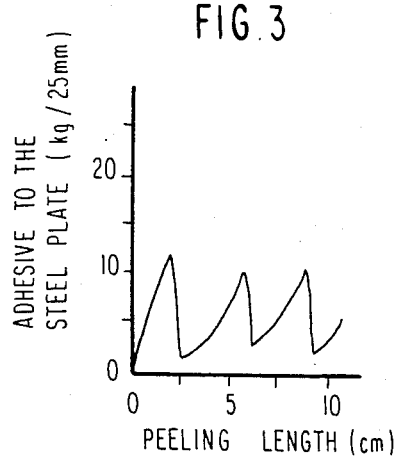
Figure 4:
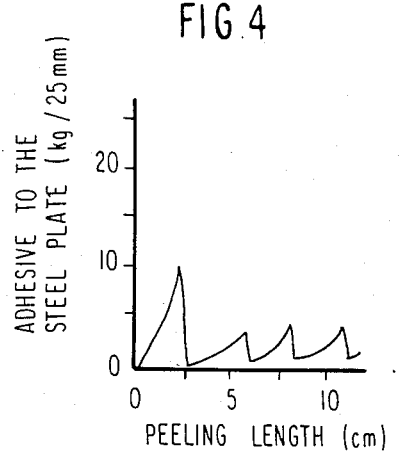

(A) The adhesion layer broke (loss of cohesive strength).
(B) The interface between the support and adhesion layer broke (loss of anchorage strength).

the state of adhesion breakage of the corrosion-resistant tape sample to the steel plate and correspond to the profiles shown in FIGS. 1 to 4, respectively. The numerals over the letters A and B indicate the average values of resistance to peeling at breaking time, and the numerals over the letters C and D indicate the maximum values of resistance to peeling at the breaking time.

COMPARATIVE EXAMPLES 4 AND 5

Primer compositions were prepared by brominated butyl rubber (which was the same as used in Examples 9 to 14) in the proportions indicated in Table 2. Corrosion-resistant tape samples were prepared using the primer compositions in the same manner as in Examples 9 to 14 and subjected to the measurement of adhesion in the same manner as in Examples 9 to 14. The results are shown in Table 2. The corrosion resistant tape prepared in Comparative Example 4 consisted of only the polyethylene sheet and butyl rubber adhesive layer and did not use a primer composition.

TABLE 2

|  | Examples | | | | | | Comparative Examples | |
|---|---|---|---|---|---|---|---|---|
|  | 9 | 10 | 11 | 12 | 13 | 14 | 4 | 5 |
| Proportions (parts) | | | | | | | | |
| Brominated butyl rubber | 100 | 100 | 100 | 100 | 100 | 100 | — | 100 |
| Polyisocyanate compound | 1 | 3 | 5 | 10 | 50 | 100 | — | — |
| Toluene | 4949 | 5047 | 5145 | 5390 | 7350 | 9800 | — | 4900 |
| Adhesion to Steel Plate (kg/25 mm) | | | | | | | | |
| 0° C. | 13 | 18 | 24 | 20 | 23 | 20 | 11 | 10 |
|  | A | A | A | A | A | A | C | D |
| −30° C. | 14 | 19 | 20 | 23 | 20 | 22 | 10 | 8 |
|  | C | A | A | A | A | A | D | D |
| −50° C. | 12 | 20 | 22 | 25 | 26 | 25 | 8 | 8 |
|  | D | B | A | A | A | A | D | D |

EXAMPLES 15 TO 20

Corrosion-resistant tape samples were prepared as in Examples 9 to 14 except that a chlorinated butyl rubber having a Cl content of 1.2 wt% and a Mooney viscosity $ML_{1+8(125° C.)}$ of 50 was used as the butyl rubber component. The adhesion of each sample to the steel plate was determine as in Examples 9 to 14, and the results are shown in Table 3.

COMPARATIVE EXAMPLES 6 AND 7

Primer compositions were prepared by chlorinated butyl rubber (which was the same as used in Examples 15 to 20) in the proportions indicated in Table 3. Corrosion-resistant tape samples were prepared using the primer compositions in the same manner as in Examples 9 to 14 and subjected to the measurement of adhesion in the same manner as in Examples 9 to 14. The results are shown in Table 3. The corrosion resistant tape prepared in Comparative Example 6 consisted on only the polyethylene sheet and butyl rubber adhesive layer and did not use a primer composition.

TABLE 3

|  | Examples | | | | | | Comparative Examples | |
|---|---|---|---|---|---|---|---|---|
|  | 15 | 16 | 17 | 18 | 19 | 20 | 6 | 7 |
| Proportions (parts) | | | | | | | | |
| Chlorinated butyl rubber | 100 | 100 | 100 | 100 | 100 | 100 | — | 100 |
| Polyisocyanate compound | 1 | 3 | 5 | 10 | 50 | 100 | — | — |
| Toluene | 4949 | 5047 | 5145 | 5390 | 7350 | 9800 | — | 4900 |
| Adhesion to Steel Plate (kg/25 mm) | | | | | | | | |
| 0° C. | 12 | 15 | 23 | 20 | 22 | 23 | 10 | 10 |
|  | A | A | A | A | A | A | C | D |
| −30° C. | 14 | 16 | 20 | 24 | 20 | 21 | 10 | 7 |
|  | C | A | A | A | A | A | D | D |
| −50° C. | 10 | 18 | 20 | 21 | 24 | 22 | 6 | 8 |
|  | D | B | A | A | A | A | D | D |

As is clear from the above data, the corrosion-resistant tapes prepared in accordance with the present invention had improved adhesion of the butyl rubber base adhesive layer to the polyethylene film or sheet support because of the primer coat formed of the primer composition of the present invention. These corrosion-resistant tapes, after being rolled on a core, could be rapidly unrolled at low temperatures of about −30° C. without causing detachment of the adhesive layer from the support.

The data in Examples 9 to 20 show that the corrosion-resistant tapes having primer coats formed from primer compositions using a modified butyl rubber such as brominated or chlorinated butyl rubber exhibited strong adhesion even at extremely low temperatures of −50° C. or thereabout.

While the invention has been described in detail and with reference to specific embodiments thereof, it will be apparent to one skilled in the art that various changes and modifications can be made therein without departing from the spirit and scope thereof.

What is claimed is:

1. A tape primer composition that forms a primer coat between a polyethylene film or sheet support and a butyl rubber base adhesive layer in the state of contacting the primer coat with both the support and the adhesive layer, said primer composition consisting essentially of a butyl rubber, polyisocyanate compound, and an organic solvent.

2. A primer composition according to claim 1 wherein the butyl rubber is at least one member selected from the group consisting of a virgin buty rubber, a reclaimed butyl rubber, a chlorinated butyl rubber, and a brominated butyl rubber.

3. A primer composition according to claim 2 wherein said reclaimed butyl rubber has a specific gravity of from 1.14 to 1.18, a rubber content of 50 to 59 wt% as rubber hydrocarbons, acetone solubles of 4 to 16 wt%, a Mooney viscosity $ML_{1+4(100° C.)}$ of from 25 to 70, a carbon black content of from 30 to 32 wt%, elongation after vulcanization $\geq 450\%$ as determined in accordance with JIS K-6313, and tensile strength after vulcanization $\geq 65$ kg/cm² as determined in accordance with JIS K-6313.

4. A primer composition according to claim 2 wherein said chlorinated butyl rubber has a chlorine content of from 1.0 to 1.4 wt% and a Mooney viscosity $ML_{1+8(125°\ C.)}$ of from 45 to 55 and $ML_{1+8(100°\ C.)}$ of from 51 to 60.

5. A primer composition according to claim 2 wherein said brominated butyl rubber has a bromine content of from 1.8 to 2.4 wt% and a Mooney viscosity $ML_{1+8(125°\ C.)}$ of from 27 to 34 and 41 to 51.

6. A primer composition according to claim 1 wherein said polyisocyanate compound contains two or three isocyanate groups in the molecule.

7. A primer composition according to claim 1 wherein said polyisocyanate compound is present in an amount of at least 0.8 part per 100 parts by weight of the butyl rubber.

8. A primer composition according to claim 1 wherein said polyisocyanate compound is present in an amount of from 1 to 200 parts per 100 parts by weight of the butyl rubber.

9. A primer composition according to claim 7 wherein said polyisocyanate compound is present in an amount of from 1 to 200 parts per 100 parts by weight of the butyl rubber.

10. A primer composition according to claim 2 wherein said organic solvent is present in an amount of from 9 to 100 parts per part by weight of the sum of the butyl rubber and polyisocyanate compound.

11. A polyethylene film or sheet support carrying thereon a butyl rubber base adhesive layer, the improvement comprising a primer composition interposed between said film or sheet support and said base adhesive layer, said primer composition consisting essentially of a butyl rubber, a polyisocyanate, and an organic solvent.

* * * * *